(12) United States Patent
Arisaka et al.

(10) Patent No.: US 7,494,737 B2
(45) Date of Patent: Feb. 24, 2009

(54) FUEL CELL HAVING MANIFOLD APERTURES AND COVER PLATES

(75) Inventors: Shinichi Arisaka, Katano (JP); Yasuo Takebe, Uji (JP); Hideo Ohara, Katano (JP); Kazuhito Hatoh, Osaka (JP); Eiichi Yasumoto, Soraku-gun (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/296,688

(22) Filed: Dec. 8, 2005

(65) Prior Publication Data

US 2007/0134541 A1   Jun. 14, 2007

(51) Int. Cl.
*H01M 2/14* (2006.01)
*H01M 8/10* (2006.01)
(52) U.S. Cl. .......................... 429/38; 429/32
(58) Field of Classification Search ............. 429/38, 429/32
See application file for complete search history.

(56) References Cited

U.S. PATENT DOCUMENTS

| 6,410,179 B1 * | 6/2002 | Boyer et al. | 429/39 |
| 7,049,023 B2 * | 5/2006 | Fujii et al. | 429/39 |
| 2004/0131918 A1 * | 7/2004 | Ohara et al. | 429/38 |
| 2006/0228616 A1 * | 10/2006 | Chen et al. | 429/38 |
| 2007/0196716 A1 * | 8/2007 | Mashimo et al. | 429/35 |

FOREIGN PATENT DOCUMENTS

| JP | 09-035726 | | 2/1997 |
| JP | 2001-176532 | | 6/2001 |
| JP | 2004-349014 | * | 9/2004 |
| JP | 2005-129306 | | 5/2005 |

* cited by examiner

*Primary Examiner*—Mark Ruthkosky
*Assistant Examiner*—Karie O'Neill
(74) *Attorney, Agent, or Firm*—McDermott Will & Emery LLP

(57) ABSTRACT

The present invention is intended to enable efficient assembly of a fuel cell stack without causing any damage to the conductive separator. In a fuel cell including an anode, a cathode, an electrolyte membrane interposed between the anode and the cathode, and conductive separators each having manifold apertures 12 and a flow channel 16 for supplying a gas to the anode or the cathode, manifold aperture connecting portions 15 are formed at an inlet-side end and an outlet-side end of the flow channel 16, respectively. Each of the manifold aperture connecting portions 15 is recessed below the upper surface of the conductive separator 11. Cover plates are fitted and fixed to the recessed portions, respectively.

2 Claims, 2 Drawing Sheets

FUEL CELL HAVING MANIFOLD APERTURES AND COVER PLATES

FIELD OF THE INVENTION

The present invention relates to a fuel cell including conductive separators having a gas flow channel for supplying a gas to an electrode and manifold apertures connecting to the gas flow channel.

BACKGROUND OF THE INVENTION

A polymer electrolyte fuel cell generates electricity and heat simultaneously by electrochemically reacting a fuel gas containing hydrogen and an oxidant gas containing oxygen such as air. Typically, the polymer electrolyte fuel cell comprises a proton conductive polymer electrolyte membrane, electrodes and conductive separators. The electrodes each comprise a combination of a diffusion layer and a catalyst reaction layer. The catalyst reaction layer, which is composed mainly of a carbon powder carrying a platinum group metal catalyst thereon, is formed on each surface of the polymer electrolyte membrane that selectively transports hydrogen ions. On the outer surface of the catalyst reaction layer is formed the diffusion layer having electron conductivity and gas permeability for fuel gas or oxidant gas.

In order to prevent supplied fuel gas and oxidant gas from leaking out and to prevent them from mixing with each other, gas sealants or gaskets are arranged on the periphery of the electrodes with the polymer electrolyte membrane sandwiched therebetween. The gas sealants or gaskets are combined in advance with the electrodes and the polymer electrolyte membrane. This is called as an MEA (membrane electrode assembly).

On the outer surfaces of the MEA are arranged the conductive separators for mechanically fixing the MEA and electrochemically connecting adjacent MEAs in series. On the surface of each conductive separator facing the MEA is formed a gas flow channel for supplying a fuel gas or oxidant gas to an electrode and exhausting a produced gas or excess gas. The gas flow channel may be formed by providing a separate member to the separator. Usually, a groove or rib is formed on the surface of the separator by means of cutting or pressing the separator surface to serve as a gas flow channel.

In order to supply a fuel gas or oxidant gas to the groove, a pipe for supplying a fuel gas or oxidant gas must be branched into individual separators. Further, a plumbing jig is necessary in which the branched pipes are connected to the grooves on the separators. Such a jig is called as an "external manifolds". The conduit through which the fuel gas or oxidant gas passes is called as an "manifold aperture".

There is another type of manifold called "internal manifold", which has a simpler structure. In an internal manifold type, a through hole is formed through a cell stack comprising an MEA and separators each having a gas flow channel, in the stacking direction thereof, and is used as a manifold aperture. Around each through hole in the MEA and the separators, a rib is formed or an O-ring is arranged therearound, to provide sufficient sealing. The manifold aperture is connected to a pipe for supplying a fuel gas or oxidant gas so that a fuel gas or oxidant gas is supplied directly from the aperture.

Since a fuel cell generates heat during its operation, it should be cooled down with cooling water or the like to maintain the cell at an appropriate temperature. Normally, a cooling unit for flowing cooling water is provided between the separators for every 1 to 3 unit cells. The cooling unit is usually a cooling water flow channel formed on the back surface of the separator.

In a typical fuel cell, 100 to 200 unit cells, each comprising an MEA, conductive separators and a cooling unit, are stacked alternately to form a cell stack, which is fixed with bolts from both ends.

In the internal manifold type stack, the gas sealants or gaskets disposed sandwiching the polymer electrolyte membrane may sometimes enter the ends of the gas flow channel, which are connected to the manifold apertures, respectively. As a consequence, a gap is created between the separators and the MEA, through which the gas leaks. In order to prevent the gas sealants or gaskets from entering the ends of the gas flow channel, for example, Japanese Laid-Open Patent Publication No. Hei 9-35726 proposes to form a tunnel structure by covering each end of gas flow channel, which is connected to corresponding manifold aperture, with a flat cover plate.

In the above separator structure, the ends of gas flow channel are covered with cover plates, respectively, but the cover plates are not fixed. This creates loss of time in the production of a cell stack. For example, it will be difficult to assemble a cell stack with the surface of the separator having a gas flow channel formed thereon facing downward.

In order to cope with this problem, attempts were made to fix the separator and the cover plate with an adhesive. However, the use of an adhesive may cause displacement beyond acceptable dimensional tolerance. Moreover, there is a concern that the plasticizer contained in the adhesive and unreacted lower molecular components might leach out, causing damage to the MEA.

BRIEF SUMMARY OF THE INVENTION

In view of the above, the present invention has been made to efficiently assemble a fuel cell stack without causing any damage to the MEA.

More specifically, the present invention relates to a fuel cell comprising: an anode; a cathode; an electrolyte membrane interposed between the anode and the cathode; an anode-side conductive separator having manifold apertures and a flow channel for supplying a fuel to the anode; and a cathode-side conductive separator having manifold apertures and a flow channel for supplying an oxidant to the cathode, wherein, manifold aperture connecting portions formed at an inlet-side end and an outlet-side end of the flow channel, respectively, in each of the conductive separators are recessed below the upper surface of the separator, and cover plates for covering each end of the flow channel are fitted and fixed to the recessed portions, respectively.

The cover plates preferably have a shape capable of fitting to the recessed portion while sandwiching the manifold aperture connecting portion. Alternatively, a rubber material may be disposed between a side face of the cover plate and a wall of the recessed portion that faces the side face so as to fix the cover plate to the recessed portion.

The cover plates may comprise a magnetic material so that the cover plates can be fixed to the manifold aperture connecting portions by the magnetic force. Further, a minute through hole may be formed on the surface of each manifold aperture connecting portion to be in contact with the lower side of the cover plate so as to fix the cover plate to the manifold aperture connecting portion by a suction force created by suction through the through hole.

DETAILED DESCRIPTION OF THE INVENTION

Embodiment 1

Figure 1:
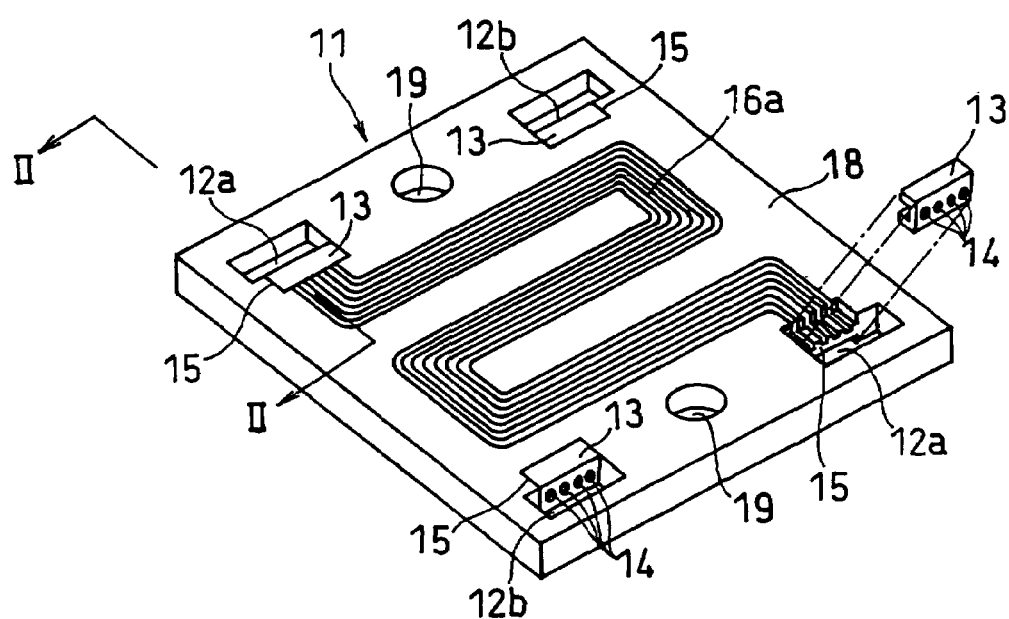
FIG. 1 is a schematic perspective view of a conductive separator according to an example of Embodiment 1 in the present invention.

FIG. 1 is a schematic perspective view of a conductive separator according to an example of Embodiment 1 in the present invention. In the drawing, a fuel gas flow channel is formed on the surface.

As can be seen in FIG. 1, a conductive separator 11 comprises: a base plate 18 having a fuel gas flow channel 16a, fuel gas manifold apertures 12a, oxidant gas manifold apertures 12b and cooling water manifold apertures 19; and cover plates 13. Each of the cover plates 13 serves to cover each end of the fuel gas flow channel 16a that communicates with each fuel gas manifold aperture 12a.

The fuel gas flow channel 16a for supplying a fuel gas and exhausting a produced gas is formed on the surface of the conductive separator 11 to be in contact with an MEA. The both ends of the fuel gas flow channel 16a are located diagonally opposite to each other on the base plate 18. Each of the fuel gas manifold apertures 12a is formed such that it adjoins to each end of the fuel gas flow channel 16a.

At the ends of the fuel gas flow channel 16a are formed manifold aperture connecting portions 15, respectively, and the manifold aperture connecting portions 15 are recessed below the upper surface of the base plate 18 having the fuel gas flow channel 16a formed thereon such that each cover plate 13 is fitted to each recessed portion.

The cover plates 13 are rectangularly concave-shaped, and each comprises a pair of supporting members facing an upper surface and a bottom surface of the manifold aperture connecting portion 15, respectively, and the cover plate 13 is fitted and fixed to the manifold aperture connecting portion 15 by sandwiching the manifold aperture connecting portion 15 with the supporting members. In other words, the cover plate 13 is fixed directly to the base plate 18 without the use of an adhesive. The upper surface of the cover plate 13 and the surface of the base plate 18 are flush with each other.

On the other surface of the conductive separator 11, i.e., the surface of the conductive separator 11 opposite to the surface thereof having the fuel gas flow channel 16a formed thereon, are formed grooves which serve as a fuel gas flow channel for supplying a fuel gas or a cooling water flow channel for flowing cooling water.

Figure 2:
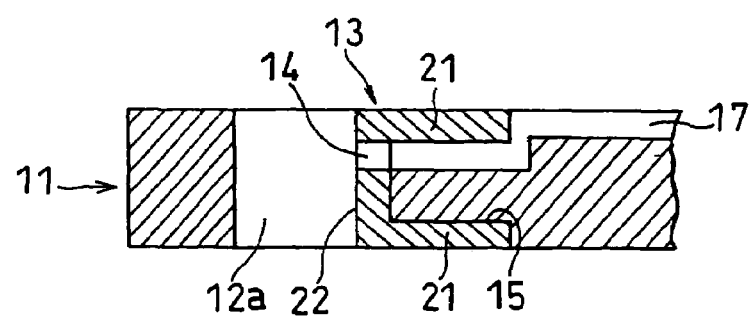
FIG. 2 is a schematic sectional view of the conductive separator taken on line II-II in FIG. 1.

FIG. 2 is a schematic sectional view of the conductive separator of FIG. 1 taken on line II-II.

As shown in FIG. 2, the cross section of the cover plate 13 is rectangularly concave-shaped, and comprises a pair of supporting members 21 facing an upper surface and a bottom surface of the manifold aperture connecting portion and a wall member 22 for connecting the ends of the pair of supporting members 21. In the wall member 22 is formed a gas flow through hole 14 that allows a gas flow groove 17 and the fuel gas manifold aperture 12a to communicate with each other. A fuel gas can be supplied or exhausted through the gas flow through hole 14.

Although, in this embodiment, description has been given for the case where the cover plate 13 has a rectangularly concave-shaped cross section, the shape of the cover plate 13 is not specifically limited as long as the cover plate 13 has a shape capable of sandwiching the manifold aperture connecting portion 15. The shape of the cover plate 13 can vary according to the shape of the manifold aperture connecting portion 15. For example, the cover plate 13 can have a U-shaped or V-shaped cross section. Further, the cover plate 13 can be fixed by engaging a groove formed in the manifold aperture connecting portion 15 with a rib formed on the cover plate 13.

Embodiment 2

Figure 3:
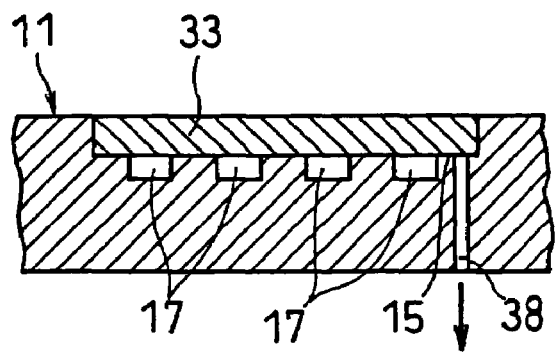
FIG. 3 is a schematic sectional view of a conductive separator according to an example of Embodiment 2 in the present invention viewed from a manifold aperture-side.

FIG. 3 is a schematic sectional view of a conductive separator according to an example of Embodiment 2 in the present invention viewed from a manifold aperture-side.

As can be seen in FIG. 3, a cover plate 33 is disposed on the upper surface of the manifold aperture connecting portion 15 (i.e., the upper surface of ribs). The cover plate 33 may be a flat plate capable of covering at least the end of the gas channel, or an L-shaped plate capable of covering the end of the gas channel as well as the end face of the manifold aperture connecting portion 15. In the case of the cover plate 33 being L-shaped, a gas flow through hole should be formed in a part of the L-shaped cover plate to be in contact with the end face of the manifold aperture connecting portion 15, so as to allow the gas flow grooves 17 and the fuel gas manifold aperture 12a to communicate with each other.

On the surface of the manifold aperture connecting portion 15 to be in contact with the underside of the cover plate 33 is formed a minute through hole 38. Accordingly, the cover plate 33 can be fixed to the manifold aperture connecting portion 15 by a suction force created by suction from an end of the through hole 38. Further, by clogging the through hole 38 after the suction, the cover plate 33 stays fixed to the manifold aperture connecting portion 15 even after the suction process.

Although, in this embodiment, description has been given for the case where the cover plate 33 is fixed to the base plate 18 by the suction, the cover plate 33 may be equipped with a pin that fits the through hole 38. By inserting the pin into the through hole 38, the cover plate 33 can be fixed to the base plate 18. Alternatively, an appropriate amount of an adhesive may be injected into the through hole 38 to fix the cover plate 33 with the base plate 18.

Embodiment 3

Figure 4:
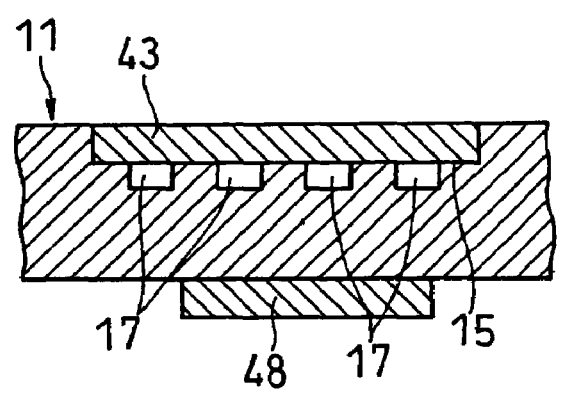
FIG. 4 is a schematic sectional view of a conductive separator according to an example of Embodiment 3 in the present invention viewed from a manifold aperture-side.

FIG. 4 is a schematic sectional view of a conductive separator according to an example of Embodiment 3 in the present invention viewed from a manifold aperture-side.

A cover plate 43 shown in FIG. 4 is made of a magnetic material and fixed to the manifold aperture connecting portion 15 by the magnetic force. In this embodiment also, the cover plate 43 may be a flat plate capable of covering at least the end of the gas channel, or an L-shaped plate capable of covering the end of the gas channel as well as the end face of the manifold aperture connecting portion 15. Alternatively, the cover plate 43 may have a rectangularly concave-shaped cross section as described in Embodiment 1. In the case of the cover plate 43 being L-shaped or rectangularly concave-shaped, a gas flow through hole should be formed so as to allow the gas flow grooves 17 and the fuel gas manifold aperture 12a to communicate with each other.

In the case where the manifold aperture connecting portion 15 is made of a magnetic material or the base plate 18 comprises a magnetized substance, by just placing the cover plate made of a magnetic material on the manifold aperture connecting portion 15, the cover plate can be fixed to the manifold aperture connecting portion 15. In the case where the manifold aperture connecting portion 15 is not made of a magnetic material, a magnet may be disposed opposite to the cover plate 43 with the manifold aperture connecting portion 15 therebetween so as to fix the cover plate to the manifold aperture connecting portion 15. More specifically, as illustrated in FIG. 4, a magnet 48 is disposed on the underside of the base plate 18, i.e., on the surface of the base plate 18 opposite to the surface thereof where the cover plate 43 is disposed, whereby the cover plate 43 can be fixed to the base plate 18. During the assembly process of a cell stack, the magnet 48 can be detached after the separator is stacked. According to this manner, the magnet 48 does not affect the size and shape of the cell stack.

Embodiment 4

Figure 5:
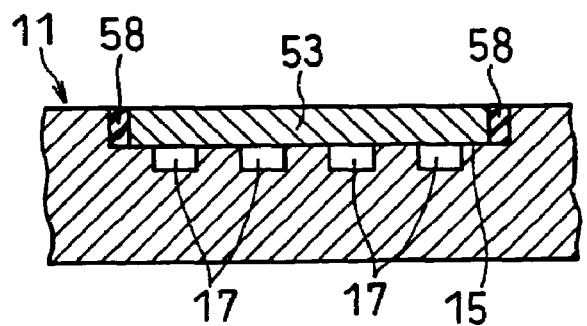
FIG. 5 is a schematic sectional view of a conductive separator according to an example of Embodiment 4 in the present invention viewed from a manifold aperture-side.

FIG. 5 is a schematic sectional view of a conductive separator according to an example of Embodiment 4 in the present invention viewed from a manifold aperture-side.

As can be seen in FIG. 5, a cover plate 53 has sealing rubbers 58 attached to the side faces thereof to be in contact with the walls of the base plate 18. The cover plate 53 may be a flat plate capable of covering at least the end of the gas channel, or an L-shaped plate capable of covering the end of the gas channel as well as the end face of the manifold aperture connecting portion 15. Alternatively, the cover plate 53 may have a rectangularly concave-shaped cross section as described in Embodiment 1. In the case of the cover plate 53 being L-shaped or rectangularly concave-shaped, a gas flow through hole should be formed so as to allow the gas flow grooves 17 and the fuel gas manifold aperture 12a to communicate with each other.

The sealing rubber 58 may be provided to the entire side face of the cover plate 53 to be in contact with the base plate 18, or to a part of the side face of the same. Instead of the sealing rubber 58, a material having a high friction coefficient may be attached. Further, the side faces of the cover plate 53 may be treated or processed to increase the friction coefficient.

The present invention will be described below in more detail with reference to examples, but it is to be understood that the present invention is not limited thereto.

EXAMPLES (1) Production of Conductive Separator

Fifty wt % of artificial graphite powder having an average particle size of about 10 μm and 38 wt % of fibrous graphite having an average diameter of 50 μm and an average length of 0.5 mm were baked at about 500° C. in air for 10 minutes. The heat-treated artificial graphite powder and fibrous graphite were kneaded with 12 wt % of thermosetting phenol resin using an extrusion kneader. The resulting kneaded powder was injected into a metal mold having machined to have grooves for gas flow channel/cooling water flow channel and manifold apertures, which was then hot-pressed under a pressure of 100 kg/cm$^2$ for 10 minutes with a metal mold temperature of 150° C.

A conductive separator thus obtained had a shape as shown in FIG. 1 with an outer dimension of 18 cm×20 cm and a thickness of 1.3 mm. The gas flow channel/cooling water flow channel had a depth of 0.5 mm.

Example 1

The cover plates 13 in accordance with Embodiment 1 were fitted to the manifold aperture connecting portions 15, respectively. Thereby, conductive separators 11 were formed. On the cathode side of an MEA sheet was disposed a conductive separator having an oxidant gas flow channel for supplying an oxidant gas to the cathode formed thereon. Likewise, on the anode side of the MEA sheet was disposed another conductive separator having a fuel gas flow channel for supplying a fuel gas to the anode formed thereon. Thereby, a unit cell was constructed. Subsequently, a cell stack was formed by stacking 120 unit cells, which was then clamped with clamping bolts from both ends to produce a fuel cell stack.

Because, in the fuel cell stack thus produced, the cover plates were fitted and fixed to the base plate, the production time was dramatically shortened compared to the case of using conventional conductive separators. In the conventional conductive separators, the cover plates were merely placed on the upper portions of the manifold aperture connecting portions, in short, the cover plates were not fixed, creating loss of time in the production of a cell stack. The construction as described above reduced the production time by about 15% compared to the production time using conventional conductive separators.

Example 2

The cover plates 33 in accordance with Embodiment 2 were disposed on the upper surfaces of the manifold aperture connecting portions, respectively. Then, the cover plates 33 were fixed by suction from an end of the through hole 38, after which the through hole 38 was clogged. Thereby, conductive separators were formed. On the cathode side of an MEA sheet was disposed a conductive separator having an oxidant gas flow channel for supplying an oxidant gas to the cathode formed thereon. Likewise, on the anode side of the MEA sheet was disposed another conductive separator having a fuel gas flow channel for supplying a fuel gas to the anode formed thereon. Thereby, a unit cell was constructed. Subsequently, a cell stack was formed by stacking 120 unit cells, which was then clamped with clamping bolts from both ends to produce a fuel cell stack.

Because, in the fuel cell stack thus produced, the cover plates was fixed to the base plate by the suction force, the production time was dramatically shortened. In the conventional conductive separators, the cover plates were merely placed on the upper portions of the manifold aperture connecting portions, in short, the cover plates were not fixed, creating loss of time in the production of a cell stack. The construction as described above reduced the production time by about 12% compared to the production time using conventional conductive separators.

Example 3

The cover plates 43 in accordance with Embodiment 3 were disposed on the upper surfaces of the manifold aperture connecting portions, respectively. Each of the cover plates 33 was fixed using a magnet. Thereby, conductive separators were formed. On the cathode side of an MEA sheet was disposed a conductive separator having an oxidant gas flow channel for supplying an oxidant gas to the cathode formed thereon. Likewise, on the anode side of the MEA sheet was disposed another conductive separator having a fuel gas flow channel for supplying a fuel gas to the anode formed thereon. Thereby, a unit cell was constructed. Subsequently, a cell stack was formed by stacking 120 unit cells. During the stacking process of the unit cells, the magnets were detached one by one. Then, the obtained cell stack was clamped with clamping bolts from both ends to produce a fuel cell stack.

Because, in the fuel cell stack thus produced, the cover plates were fixed to the base plate by the magnetic force during the assembly process of the cell stack, the production time was dramatically shortened. In the conventional conductive separators, the cover plates were merely placed on the upper portions of the manifold aperture connecting portions, in short, the cover plates were not fixed, creating loss of time in the production of a cell stack. The construction as described above reduced the production time by about 13% compared to the production time using conventional conductive separators.

Example 4

The cover plates 53 in accordance with Embodiment 4 having rubber materials were fitted to the manifold aperture connecting portions, respectively. Thereby, conductive separators were formed. On the cathode side of an MEA sheet was disposed a conductive separator having an oxidant gas flow channel for supplying an oxidant gas to the cathode formed thereon. Likewise, on the anode side of the MEA sheet was disposed another conductive separator having a fuel gas flow channel for supplying a fuel gas to the anode formed thereon. Thereby, a unit cell was constructed. Subsequently, a cell stack was formed by stacking 120 unit cells, which was then clamped with clamping bolts from both ends to produce a fuel cell stack.

Because, in the fuel cell stack thus produced, the cover plates were fixed to the base plate by the rubber material, the production time was dramatically shortened. In the conventional conductive separators, the cover plates were merely placed on the upper portions of the manifold aperture connecting portions, in short, the cover plates were not fixed, creating loss of time in the production of a cell stack. The construction as described above reduced the production time by about 12% compared to the production time using conventional conductive separators.

As described above, according to the present invention, the cover plates are fixed to the manifold aperture connecting portions of the base plate by fitting the cover plates to the manifold aperture connecting portions, respectively, so that the easy handling of the conductive separator is achieved and the time for assembling the fuel cell stack can be shortened.

The invention claimed is:

1. A fuel cell comprising:
   an anode;
   a cathode;
   an electrolyte membrane interposed between said anode and said cathode;
   an anode-side conductive separator having manifold apertures and a flow channel for supplying a fuel to said anode; and
   a cathode-side conductive separator having manifold apertures and a flow channel for supplying an oxidant to said cathode,
   wherein, manifold aperture connecting portions formed at an inlet-side end and an outlet-side end of said flow channel, respectively, in each of said anode-side conductive separator and said cathode-side conductive separator, are recessed below the upper surface of said separator, and
   cover plates for covering each end of said flow channel are fitted and fixed to the recessed portions, respectively,
   wherein said cover plates have a pair of supporting members facing an upper surface and a bottom surface of the manifold aperture connecting portion.

2. A fuel cell comprising:
   an anode;
   a cathode;
   an electrolyte membrane interposed between said anode and said cathode;
   an anode-side conductive separator having manifold apertures and a flow channel for supplying a fuel to said anode; and
   a cathode-side conductive separator having manifold apertures and a flow channel for supplying an oxidant to said cathode,
   wherein, manifold aperture connecting portions formed at an inlet-side end and an outlet-side end of said flow channel, respectively, in each of said anode-side conductive separator and said cathode-side conductive separator, are recessed below the upper surface of said separator, and
   cover plates for covering each end of said flow channel are fitted and fixed to the recessed portions, respectively
   wherein a rubber material is arranged between a side face of said cover plate and a wall of the recessed portion that faces said side face so as to fix said cover plate to the recessed portion.

* * * * *